(12) United States Patent
Lee

(10) Patent No.: US 7,490,339 B2
(45) Date of Patent: Feb. 10, 2009

(54) CLEANING DEVICE FOR THE MAIN SHAFT CD CARRYING TRAY OF A CD PLAYER

(76) Inventor: Tung Shan Lee, No. 57, Alley 19, Lane 38, Yungle St., Lujou City, Taipei (TW)

( * ) Notice: Subject to any disclaimer, the term of this patent is extended or adjusted under 35 U.S.C. 154(b) by 453 days.

(21) Appl. No.: 11/264,047

(22) Filed: Nov. 2, 2005

(65) Prior Publication Data
US 2007/0094818 A1 May 3, 2007

(30) Foreign Application Priority Data
Sep. 23, 2005 (TW) .............................. 94216466 U

(51) Int. Cl.
*G11B 3/58* (2006.01)
(52) U.S. Cl. ....................................................... 720/722
(58) Field of Classification Search ........................ None
See application file for complete search history.

(56) References Cited

U.S. PATENT DOCUMENTS

| | | | | |
|---|---|---|---|---|
| 4,545,047 A * | 10/1985 | Rickert | .................... | 720/724 |
| 6,058,088 A * | 5/2000 | Cheng | .......................... | 369/71 |
| 6,157,605 A * | 12/2000 | Mori | .......................... | 720/648 |
| 6,826,145 B2 * | 11/2004 | Oishi et al. | .................. | 720/738 |
| 2002/0172124 A1 * | 11/2002 | Weng | .......................... | 369/72 |
| 2007/0036057 A1 * | 2/2007 | Lee | .............................. | 369/72 |

* cited by examiner

*Primary Examiner*—Mark Blouin
(74) *Attorney, Agent, or Firm*—Bacon & Thomas, PLLC

(57) ABSTRACT

A cleaning device for the main shaft CD carrying tray of a CD player includes a sheet body and an attachment layer. The sheet body made of a preset material is to be placed on the tray of a CD player and conveyed into the CD player, having a center-positioning hole to be fitted on the center projecting portion of the CD carrying tray of the CD player. The surface of the attachment layer has proper viscosity or suction property, and the attachment layer has its underside fixed on the circumferential portion of the positioning hole of the sheet body, having its surface range covering at least the circumferential portion of the CD carrying tray, which supports the CD. Impurities attached on the circumference of the CD carrying tray can be adhered and cleared away by the attachment layer of the cleaning device.

18 Claims, 7 Drawing Sheets

CLEANING DEVICE FOR THE MAIN SHAFT CD CARRYING TRAY OF A CD PLAYER

BACKGROUND OF THE INVENTION

1. Field of the Invention

This invention relates to a cleaning device for the main shaft CD carrying tray of a CD player, particularly to one provided with an attachment layer able to adhere and clear away impurities accumulated on the CD contact surface of the main shaft CD carrying tray.

2. Description of the Prior Art

A CD-ROM or a DVD-ROM player generally consists of an optical system, a hardware circuit board and a precision mechanical structure. The mechanical structure is provided for supporting and carrying an optical system and a hardware circuit board and composed of a movable tray, a main shaft motor and a CD pressing device. The movable tray is provided for receiving a CD thereon and conveying the CD into the interior of a CD player. The main shaft motor is provided with a rotor for connecting and rotating the CD carrying tray. The CD pressing device is positioned above the CD carrying tray for closely pressing and fixing the CD. Further, the CD carrying tray is formed with a center projecting portion for positioning the center positioning hole of the CD and has its circumference provided with a CD contact surface for supporting the circumference of the center positioning hole of the CD and rotating the CD. The optical system includes an optical read head able to move diametrically along the CD and emit loser light with light spots for carrying out reading or writing on the very fine tracks of a CD. When a CD, a CD-RW, a DVD or a DVD-RW is put in a CD player for data reading, a problem of starting up or failing to carry out data reading may occasionally occur to a CD player. For the present, various kinds of CD player cleaning implements are employed for clearing away the impurities attached on the optical read head so as to solve the problem mentioned above.

However, the conventional CD player cleaning implement is mainly used for cleaning up the optical read head. In other words, only when the trouble of a CD player is caused by impurities attached on the optical read head, can the CD player cleaning implement function to eliminate the trouble. As a mater of fact, troubles of a CD player may result from other reasons. For instance, when the CD contact surface at the circumference of the CD carrying tray of a CD player is attached with impurities, a CD may not be placed horizontally on the CD carrying tray but in a slanting condition. Thus, when the CD is actuated to rotate at high speed, the rotation center of the CD cannot be coincident with the center of the circle of the CD data tracks. Under the circumstances, the data tracks of the CD are unable to rotate smoothly but moves up and down or bias to the right or the left, thus resulting in focusing errors (a light spot becoming large) and track-following errors (a light spot deviating form the signal tracks) and consequently disabling the CD to be read. That is to say, in case impurities attach on the CD contact surface and the CD cannot be placed horizontally on the CD carrying tray, the CD, during rotating, may swing bias and vibrate excessively to exceed the automatically focusing limit of the optical read head. As a result, the CD player is hard to start and the optical read head become unable to read and write. At present, not any CD or DVD or the CD contact surface of the CD carrying tray is provided with a dust-preventing device for preventing impurities from attaching on the CD carrying tray or for removing the impurities from the CD carrying tray.

SUMMARY OF THE INVENTION

The objective of the invention is to offer a cleaning device for the main shaft CD carrying tray of a CD player, which includes a sheet body and an attachment layer. The sheet body is to be placed on the tray of a CD player and conveyed into the interior of the CD player, having a center positioning hole to be fitted with and positioned on the center projecting portion of the CD carrying tray of a CD player. The surface of the attachment layer has proper viscosity or suction property, and the attachment layer has its underside fixed on the circumference of the positioning hole of the sheet body, having its range covering the CD contact surface at the circumference of the CD carrying tray.

The cleaning device for the CD carrying tray of a CD player in the present invention is able to clear away impurities accumulated on the CD contact surface of the CD carrying tray so as to enable the CD to be placed on the CD carrying tray horizontally and rotated thereon smoothly and insure the optical read head of a CD player to carry out reading or writing smoothly on the fine tracks of the CD.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
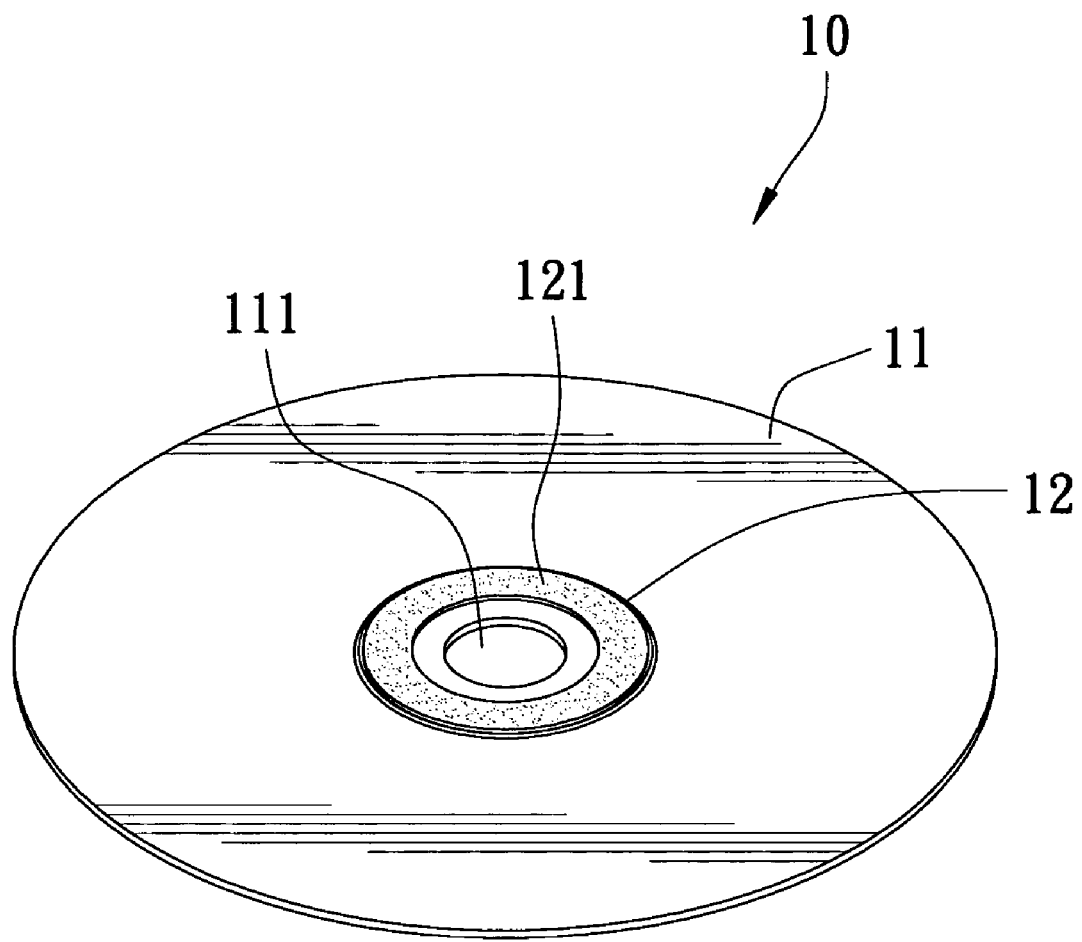
FIG. 1 is a perspective view of a cleaning device for the main shaft CD carrying tray of a CD player in the present invention.
Figure 2:
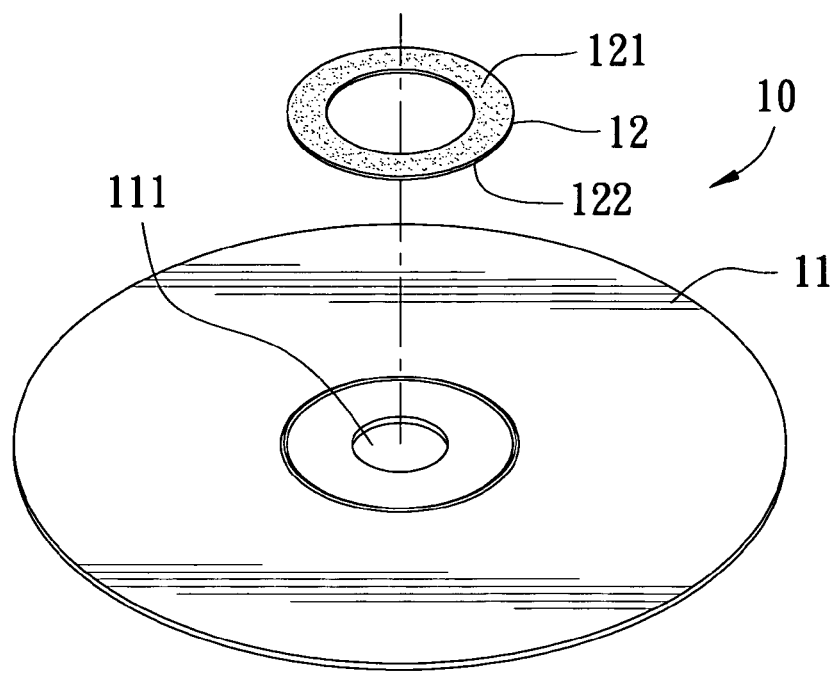
FIG. 2 is an exploded perspective view of the cleaning device in the present invention.
Figure 3:
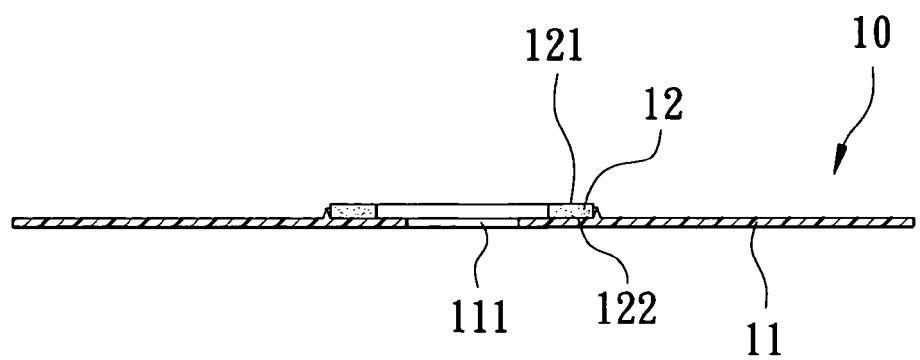
FIG. 3 is a side cross-sectional view of the cleaning device in the present invention.

A first preferred embodiment of a cleaning device 10 for the CD carrying tray of a CD player in the present invention, as shown in FIGS. 1, 2 and 3, includes a sheet body 11 and an attachment layer 12.

Figure 4:
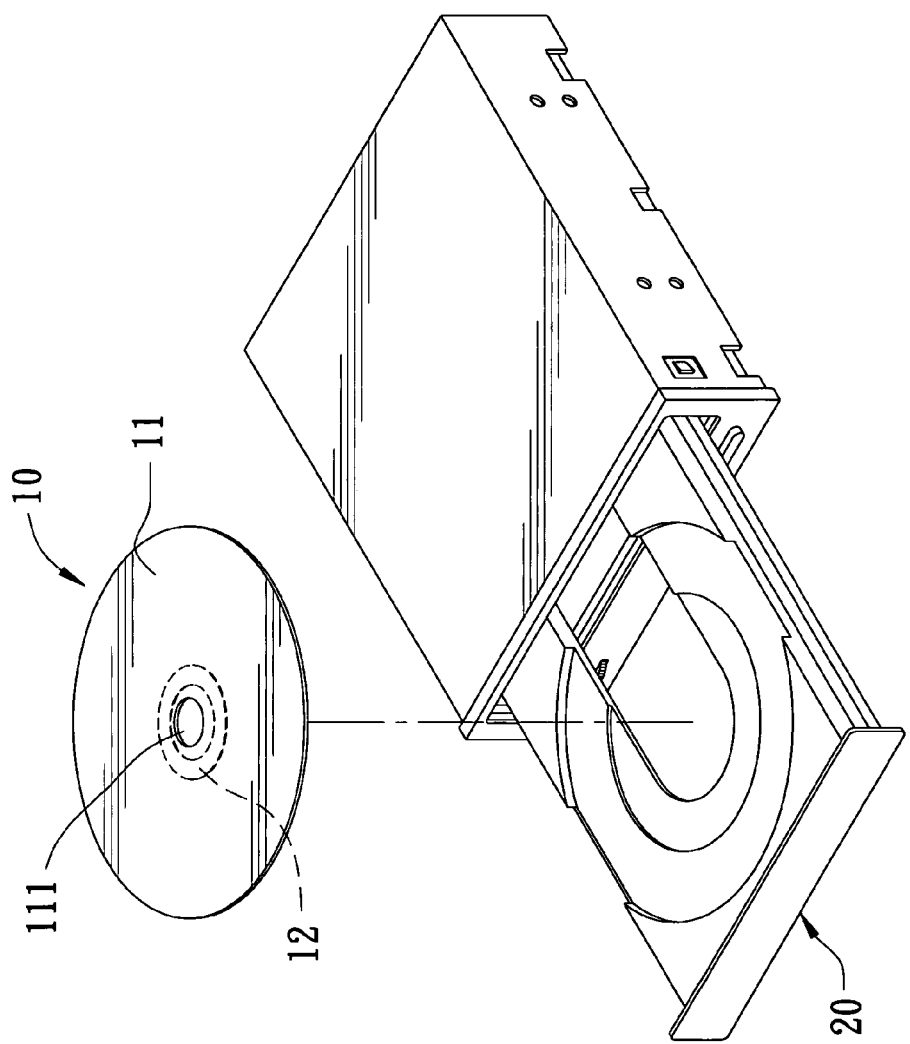
FIG. 4 is a perspective view of the cleaning device to be placed on a push-out CD carrying tray in the present invention.
Figure 5:
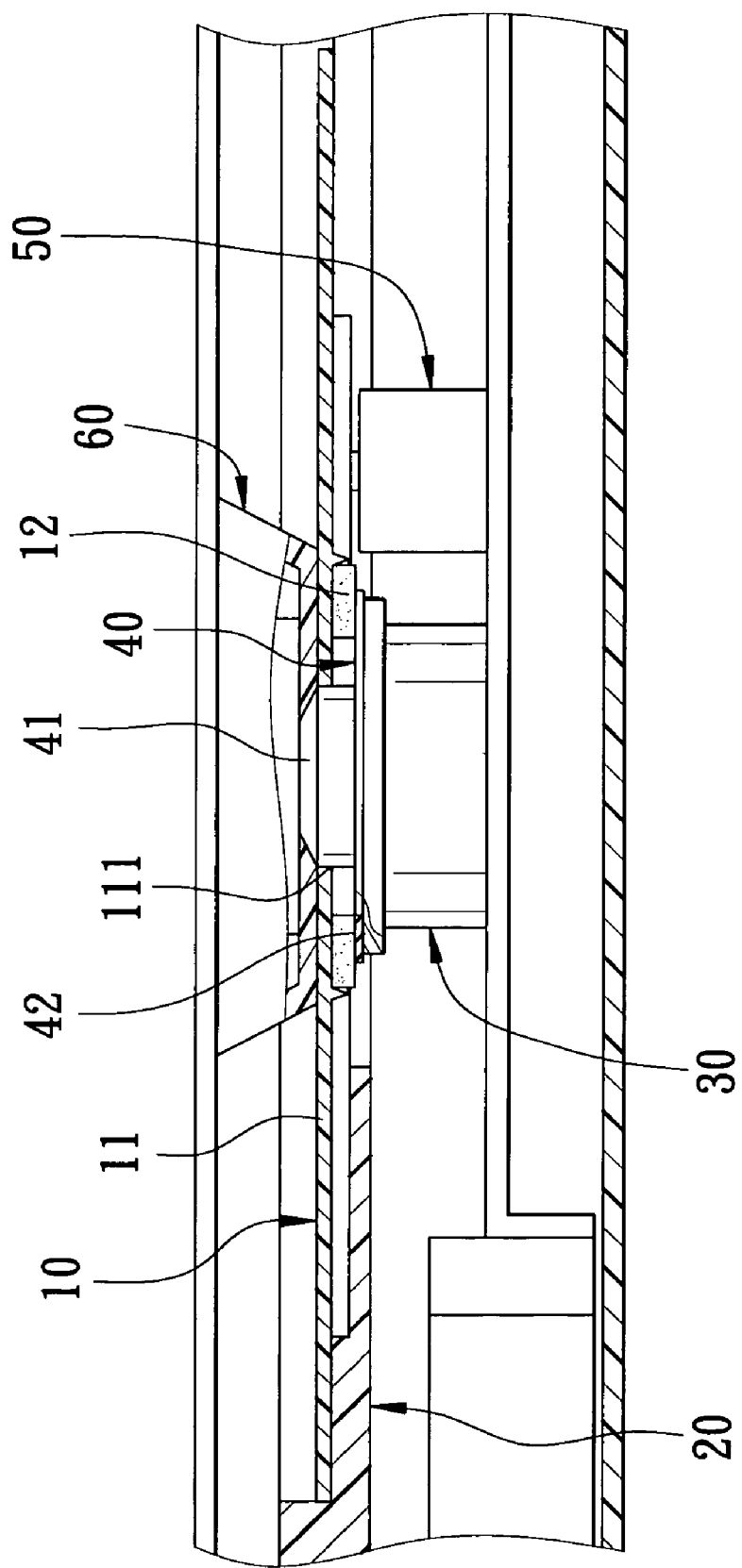
FIG. 5 is a partial side cross-sectional view of the cleaning device carrying out cleaning work in the interior of a CD player in the present invention.

The sheet body 11 shaped as a disc is made of paper, plastic, metal or other proper materials, and its size and thickness are similar to those of a common CD or DVD. The sheet body 11 can also be designed into a facial sketch of a cartoon character or shaped as an animal or the like. The sheet body 11 is to be placed on the CD tray 20 of a CD player and conveyed to the interior of a CD player, as shown in FIGS. 4 and 5. The sheet body 11 is bored with a positioning round hole 111 in the center to be fitted with and positioned on the center-projecting portion 41 of a CD carrying tray 40 above the main shaft motor 30 of a CD player.

The attachment layer 12 is an annular center-hollowed body with a preset thickness and can be combined on the sheet body 11 by compression or combined on the sheet body 11 by gluing. In this preferred embodiment, the attachment layer 12 has its surface 121 provided with a separable adhesive membrane, such as non-sticky adhesive, pressure-sensitive adhesive, emulsion, silica gel and the like, letting the surface 121 of the attachment layer 12 have comparatively low viscosity. Further, the underside 122 of the attachment layer 12 is provided thereon with an adhesive membrane with comparatively high viscosity to be fixedly glued on the circumference of the positioning hole 111 of the sheet body 11 at the circumferential side of the main shaft motor 30 of the CD player. Furthermore, the range of the attachment layer 12 covers at least the CD contact surface 42 of the CD carrying tray 40.

Referring to FIGS. 4 and 5, when impurities are found attaching on the CD contact surface 42 of the CD carrying tray 40 and the CD cannot be horizontally placed on the CD carrying tray 40, and when the CD is rotated, it swings bias or vibrates to disable the optical read he ad 50 to focus automatically and carry out reading and writing, the cleaning device 10 of this invention can be placed on the tray 20 and conveyed to the interior of the CD player. At this time, the center-positioning hole 111 of the cleaning device 10 will be fitted on the center projecting portion 41 of the CD carrying tray 40 above the main shaft motor 30, and the cleaning device 10 will be clamped by both the CD carrying tray 40 and the CD press device 60. Simultaneously, the attachment layer 12 at the circumference of the center positioning hole 111 of the cleaning device 10 can closely contact with the CD contact surface 42 of the CD carrying tray 40 to let the impurities on the CD contact surface 42 stuck to the attachment layer 12 and then cleared away from the CD carrying tray 40 after the cleaning device 10 is removed from the tray 20 of the CD player, able to clear away the impurities on the CD contact surface 42 easily and quickly to enable the optical read head to recover its function of reading and writing. In addition, the cleaning device 10 can be repeatedly turned at different angles and positions and then placed on the tray 20 of the CD player anew for use, able to clean up the CD contact surface 42 of the CD carrying tray 40 many times.

Figure 6:
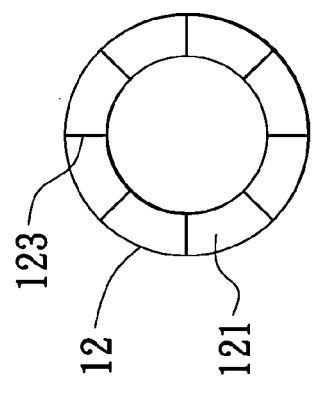
FIG. 6(A)(B)(C)(D)(E) are upper views of the cleaning devices having the surfaces of their attachment layers respectively formed with different-shaped air-guiding grooves in the present invention.
Figure 6:
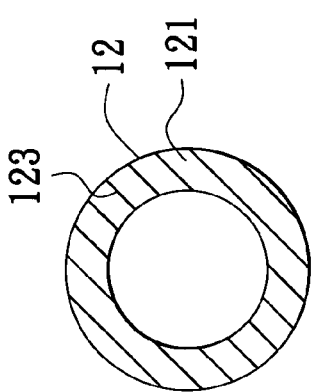
Figure 6:
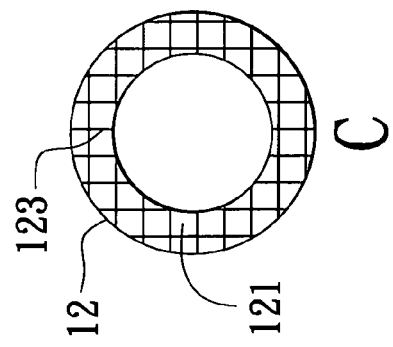
Figure 6:
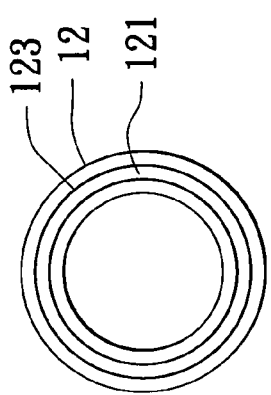
Figure 6:
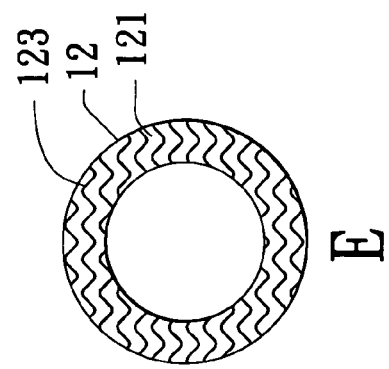

Referring to FIG. 6, the surface 121 of the attachment layer 12 of the cleaning device 10 is cut with a plurality of regularly arranged air-guiding recesses 123 for preventing the cleaning device 10 from being placed reversely on the tray 20 of the CD player by mistake and, by the air-guiding action of the air-guiding recesses 123, enabling the attachment layer 12 of the cleaning device 10 to be easily separated from the CD press device 60 when the surface 121 of the attachment lay 12 contacts with the CD press device 60, increasing smoothness and safety in use.

Figure 7:
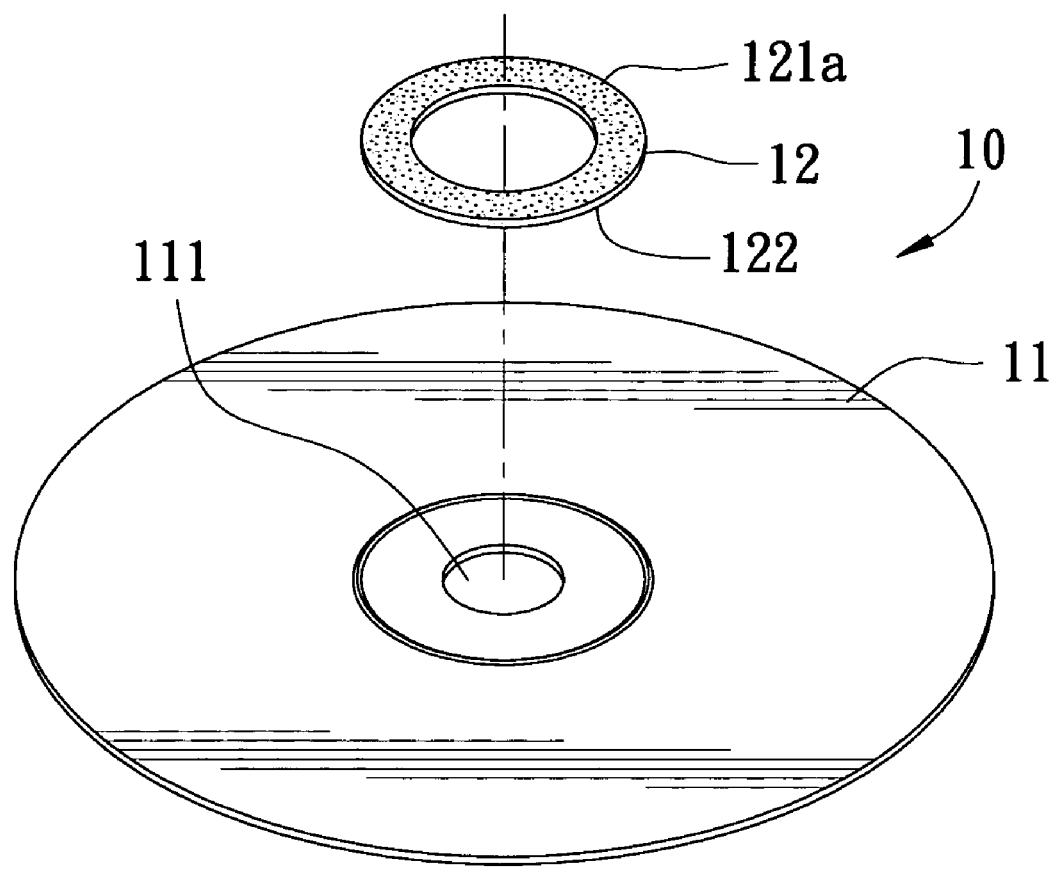
FIG. 7 is a perspective view of a second embodiment of a cleaning device having a foamed material provided on the surface of its attachment layer in the present invention.

A second preferred embodiment of the cleaning device 10 in the present invention, as shown in FIG. 7, is to have the surface 121a of the attachment layer 12 provided with a foamed material with adherence property for sucking impurities in many tiny gaps formed in the foamed material.

Figure 8:
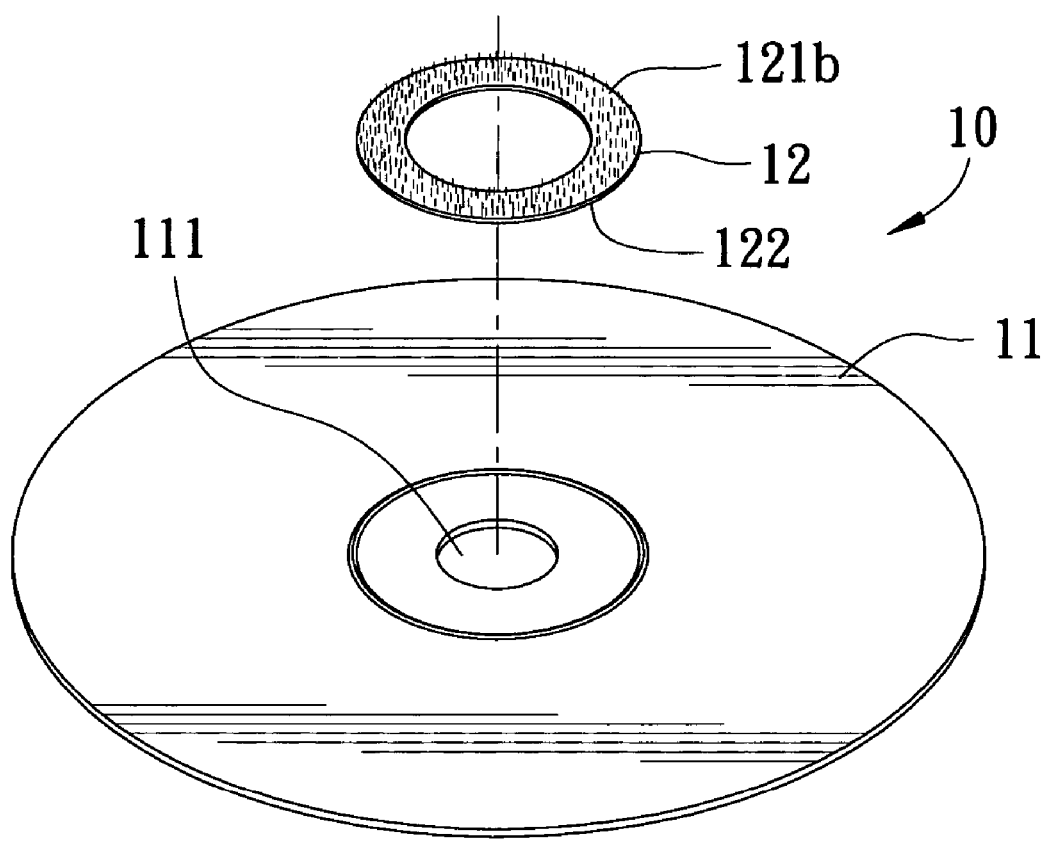
FIG. 8 is a perspective view of a third embodiment of a cleaning device having fiber flannel provided on the surface of its attachment layer in the present invention.

A third preferred embodiment of the cleaning device 10 in the present invention, as shown in FIG. 8, is to have the surface 121b of the attachment layer 12 provided with fiber flannel for sucking impurities by its fiber or by the suction function of static electricity.

As can be understood from the above description, 20 the cleaning device 10 for the CD carrying tray of a CD player of this invention is simple in structure, easy to be produced with low cost, convenient in use and having excellent effect on cleaning up the CD carrying tray for recovering the original function and prolonging the service life of the CD player.

While the preferred embodiments of the invention have been described above, it will be recognized and understood that various modifications may be made therein and the appended claims are intended to cover all such modifications that may fall within the spirit and scope of the invention.

I claim:

1. A cleaning device for the main shaft CD carrying tray of a CD player, said cleaning device comprising:
    a thin sheet body made of a preset material, said sheet body being configured to be placed on a tray of a CD player and conveyed to the interior of said CD player, said sheet body being bored with a positioning hole in the center, said positioning hole of said sheet body being configured to be fitted with a center projecting portion of a main shaft CD carrying tray; and
    an attachment layer with a preset thickness having a sticky surface formed with a viscosity or suction property, such that said sticky surface of said attachment layer is able to adhere or suck fine impurities, said attachment layer having an underside fixed on a circumference of said positioning hole of said sheet body, said attachment layer being firmly secured on said sheet body, a range of said attachment layer covering at least a CD contact surface formed at the circumference of said main shaft CD carrying tray, whereby said attachment layer is able to adhere and clear away impurities on said CD contact surface.

2. The cleaning device for the main shaft CD carrying tray of a CD player as claimed in claim 1, wherein said sheet body is shaped as a round disc.

3. The cleaning device for the main shaft CD carrying tray of a CD player as claimed in claim 1, wherein said sheet body is shaped non-circular.

4. The cleaning device for the main shaft CD carrying tray of a CD player as claimed in claim 1, wherein the size and the thickness of said sheet body are similar to those of a CD or a DVD.

5. The cleaning device for the main shaft CD carrying tray of a CD player as claimed in claim 1, wherein said sheet body is made of paper.

6. The cleaning device for the main shaft CD carrying tray of a CD player as claimed in claim 1, wherein said sheet body is made of plastic.

7. The cleaning device for the main shaft CD carrying tray of a CD player as claimed in claim 1, wherein said sheet body is made of metal.

8. The cleaning device for the main shaft CD carrying tray of a CD player as claimed in claim 1 wherein said attachment layer and said sheet body are integrally combined together.

9. The cleaning device for the main shaft CD carrying tray of a CD player as claimed in claim 1, wherein said attachment layer is combined with said sheet body by gluing.

10. The cleaning device for the main shaft CD carrying tray of a CD player as claimed in claim 1, wherein said attachment layer is an annular center-hollowed body.

11. The cleaning device for the main shaft CD carrying tray of a CD player as claimed in claim 1, where in the surface of said attachment layer is an adhesive membrane able to be stripped.

12. The cleaning device for the main shaft CD carrying tray of a CD player as claimed in claim 1, wherein said adhesive membrane is non-sticky adhesive.

13. The cleaning device for the main shaft CD carrying tray of a CD player as claimed in claim 1, wherein said adhesive membrane is pressure-sensitive adhesive.

14. The cleaning device for the main shaft CD carrying tray of a CD player as claimed in claim 1, wherein said adhesive membrane is emulsion.

15. The cleaning device for the main shaft CD carrying tray of a CD player as claimed in claim 1, wherein said adhesive membrane is silica gel.

16. The cleaning device for the main shaft CD carrying tray of a CD player as claimed in claim 1, wherein the surface of said attachment layer is provided with a foamed material with adhesive property.

17. The cleaning device for the main shaft CD carrying tray of a CD player as claimed in claim 1, wherein the surface of said attachment layer is provided with fiber flannel with suction property.

18. The cleaning device for the main shaft CD carrying tray of a CD player as claimed in claim 1, wherein the surface of said attachment layer is cut with air-guiding recesses preset in shape and number.

\* \* \* \* \*